United States Patent [19]

Akerlow

[11] Patent Number: 4,756,889

[45] Date of Patent: Jul. 12, 1988

[54] PROCESS FOR RECOVERING METALS AND METALLIC SALTS

[75] Inventor: Earl V. Akerlow, Ellwood City, Pa.

[73] Assignee: Ellwood Chemical Processing, Inc., Ellwood City, Pa.

[21] Appl. No.: 41,598

[22] Filed: Apr. 22, 1987

[51] Int. Cl.$^4$ .................. C22B 13/00; C22B 15/12
[52] U.S. Cl. .................................. 423/140; 75/24; 75/109
[58] Field of Search .............. 75/24, 101 R, 109; 423/140

[56] References Cited

U.S. PATENT DOCUMENTS

| | | | |
|---|---|---|---|
| 2,772,230 | 11/1956 | Hollander et al. | 423/140 |
| 3,676,105 | 7/1972 | McLeod et al. | 75/24 |
| 3,798,024 | 3/1974 | Murphy et al. | 75/24 |
| 4,108,635 | 8/1978 | Reynolds | 75/24 |
| 4,119,136 | 10/1978 | Gancarz, Sr. | 75/24 |
| 4,303,441 | 12/1981 | Lamisse | 75/109 |
| 4,309,215 | 1/1982 | Nissen et al. | 75/109 |

*Primary Examiner*—John Doll
*Assistant Examiner*—Wayne A. Langel
*Attorney, Agent, or Firm*—Webb, Burden, Ziesenheim & Webb

[57] ABSTRACT

A process for recovering solder alloys and metallic salts from $ZnCl_2$-containing dross/flux salt feedstock by (1) heating a quantity of the feedstock to melt the salts and to separate and/or to draw off free metal, (2) infusing and concomitantly heating an aqueous solvent with the hot salt fraction to dissolve the contained salts, (3) differentially precipitating any lead salts present by controlled initial cooling, (4) removing copper and remaining residual lead by ion transfer with zinc metal anodes, (5) stripping the solution of iron by chemical oxidation and precipitation of $Fe(OH)_3$, and (6) condensing the remaining zinc chloride solution (which may retain sodium and/or potassium salts therein). The presence of the waste flux salts enhances feedstock melting as a whole and, if desired, a drum or container containing the mixed feedstocks may itself be charged in entirety to the heating chamber or vessel. The drum, which does not melt, may then be retrieved for reuse. The technique is particularly well suited for use in the reclamation of $ZnCl_2$ from dross/flux salt feedstocks.

12 Claims, No Drawings

PROCESS FOR RECOVERING METALS AND METALLIC SALTS

FIELD OF THE INVENTION

The present invention relates to a cost-effective, low-pollutant process for recovering valuable metals and metallic salts from waste drosses and/or discarded fluxes, particularly those drosses and fluxes generated in the can- and container-manufacturing industries.

INTRODUCTION

The composition of solder varies according to the purpose for which it is intended. A common solder, traditionally used for electrical connections, is a soft alloy of 60% tin and 40% lead. In applications requiring harder solders, however, the solders are usually alloys containing silver, copper, zinc or aluminum. For example, metals such as aluminum, which do not readily form alloys, require solder containing a high proportion of aluminum for effective results. Specialized solder alloys frequently contain valuable metal constituents, therefore, and any quantities of such metals, or pieces of the solder itself, trapped in drosses or discarded flux salts always represent significant and costly waste.

Contamination and waste of flux salts themselves likewise constitutes a significant loss. Inorganic salt-containing soldering fluxes known in the art ordinarily include one or more of alkali metal chlorides and fluorides (particularly sodium and potassium) and the salts of zinc, copper and iron, usually as chlorides. After repeated use, soldering fluxes become contaminated with micron-sized particles of the metals being joined as well as with oxides and salts of those metals. This contamination of the fluxing salts reduces soldering protection while also resulting in weakened metal joints, and contaminated flux salts must, therefore, be discarded periodically. Flux salt contamination thus results in costly loss of both free metal and the flux salts themselves, with the most serious loss being, when it is present in the flux, that of the expensive zinc chloride ($ZnCl_2$) flux component.

A number of processes for recovering metals and metallic salts from drosses and fluxes, particularly drosses, have been developed heretofore. For example, U.S. Pat. No. 4,108,635 to Reynolds discloses a method for recovering solder, zinc chloride, ammonium chloride and lead from solidified solder by grinding and water leaching the solder, separating and heat refining the remaining solids, and filtering and separating the leach slurry. (Of interest also is the applicant's own prior art process for removing smeltable free metals from dross/flux salt wastes. In this process, which was in limited use in the United States between 1982 and 1983 but was never published, dross/flux salt wastes were crushed, wet screened and classified in two aqueous separation steps in order to remove free metals and smeltable oxides. No other reclamation of flux salt constituents was made or contemplated, and no heat was applied during the process.) Unfortunately, with respect to Reynolds, heat refining or remelting of drosses (even ground and leach-purified drosses) commonly entails production of copious quantities of slag, and ever-stricter environmental protection laws continue to require the development of alternate metal and salt recovery methods.

One such improved method for recovering metals from drosses is disclosed in Bamji, P. J., "Coreless Induction Versus Rotary Furnace Melting of Ball-Milled Drosses," *Light Metals* 1984, Metallurgical Society/AIME, pp. 1193–1204, Los Angeles (1984). Bamji discloses the use of a coreless induction furnace to remelt drosses; he contends that with its inherent electromagnetic stirring the coreless furnace provides metal recovery comparable to that of a conventional rotating furnace, but does so producing relatively small quantities of slag. Other recovery processes include dross compression, as disclosed in Zahorka, G., "New Process of Direct Metal Recovery from Drosses in the Aluminum Casthouse," *Light Metals* 1986, Vol. 2, Metallurgical Society/AIME, pp. 769–776, New Orleans (1986).

Reliance upon the elaborate equipment and processes of the prior art presents at least one major disadvantage—high cost—in typical metal and metallic salt recovery systems. Moreover, until now, no process has been developed to recycle "hazardous waste" drums of mixtures of tin/lead solder drosses with $ZnCl_2$-containing flux salts. A need remains, therefore, for a cost-effective, low pollutant process for recovering valuable metals and metallic salts from dross/flux salt wastes, which process is simple and practical enough for widespread use in industry and for recycling.

SUMMARY OF THE INVENTION

In order to meet this need, the present invention is a process for recovering metals and metallic salts from mixed dross/flux salt feedstocks by (1) heating the feedstocks to melt the salts and to draw off free metal, (2) infusing and concomitantly heating an aqueous solvent with the hot salt fraction to dissolve the contained salts, (3) differentially precipitating any lead salts present by controlled initial cooling, (4) removing copper and remaining residual lead by ion transfer, (5) removing any iron present by chemical oxidation and precipitation, and (6) condensing the remaining zinc chloride solution (which may retain sodium and/or potassium salts therein). The presence of the waste flux salts enhances feedstock melting as a whole and, if desired, a drum or container containing the mixed feedstocks may itself be charged in entirety to the heating chamber or vessel. The drum, which does not melt, may then be retrieved for reuse. The present technique is particularly well suited for use with zinc chloride-containing dross/flux salt feedstocks generated during the manufacture of cans and in other metal joining and soldering techniques in which tin-lead solders are used with soldering fluxes.

DETAILED DESCRIPTION OF THE INVENTION

Particularly in the can- and container-manufacturing industries, large quantities of acid fluxes (acidic solutions of flux salts) and solders are used to form strong container seams. As a result of the high annual production volume in this industry, it is not surprising that the unavoidable waste materials-solder drosses and contaminated flux salts--are likewise generated in sizeable amounts every year. As might be expected, the drosses and contaminated fluxes are almost always combined for the purpose of disposal, and are customarily charged to steel disposal drums. Unfortunately, used flux salts and solder drosses generally constitute hazardous wastes and, until the development of the present invention, no optimal process existed for their recycling.

The present process for recycling drums of such feedstocks begins by heating them, within a heating tank or furnace, to between about 600°–750° F., or preferably to between about 650°–700° F. If the feedstock is partially or completely solidified within the disposal drum, the entire drum may be charged to the furnace. Because tin-lead solders and the common metal particulates melt by about 650° F., generally, any solder pieces or other free metal present in the mixed feedstocks melt and pool in the bottom of the furnace. The free metal may thereafter be drawn off by, for example, a valved outlet. If necessary, the recovered free metal may be remelted and alloyed and then cast in commercial size bars for reuse or sale, or may be used or sold as is. The remaining salt fraction in the mixed feedstocks, at least a major portion of which melt in the 400°–500° F. range, forms the upper molten layer. The steel disposal drums do not melt at all and may be mechanically retrieved at any point of the process.

The furnace, which is equipped with a means (valved outlet, flume pump, etc.) to discharge the upper molten layer, then serves to direct the at least predominantly molten flux salts to a solvent leach tank. The solvent tank is filled with 70° F. water (chemically pure water is the preferred solvent) so that those hot salts which are water soluble immediately go into solution due to the heating of the water by the hot salts. The weight of solvent in the tank should be between 1 to 5 parts of the weight of the molten solids, as determined by the specific gravity of the solids or molten salt, so that the hot salts, including the heat of reaction, raise the temperature of the solvent (water) at least in the range of 120° to 130° F. Insoluble salts, generally inerts, containing no free metal or water-soluble salts such as tin-lead oxides may be filtered from the aqueous solvent and may be sold as the "tin-lead concentrates" known in the art.

The solution is then directed to a stabilizing tank where it is carefully cooled to 70° F. This controlled cooling of the concentrated solute causes the highly insoluble lead chloride (and other lead salt fraction) to precipitate out of solution first. Excessive cooling (i.e., cooling to below 70° F.) is avoided by means known in the art. The lead salt precipitate is removed from the solution and, accordingly, the remaining solute in the aqueous solution contains metallic salts of zinc, potassium, sodium, copper and iron, ordinarily as chlorides.

The solution containing the zinc, potassium, sodium, copper and iron salts is directed to a second stabilizing tank fitted with zinc metal anodes known in the art. By the well-known process of "cementation," the zinc metal displaces the copper, lead and other heavy metal ions in solution that are below it in the electrochemical series. Copper and residual minimal lead precipitate from solution as a result. The remaining solution accordingly contains salts of zinc, sodium, potassium and iron.

The remaining solution is then stripped of its iron by acidification, oxidation and precipitation of insoluble $Fe(OH)_3$ (ferric hydroxide). Preferably, the solution is acidified to a pH of between 1.0 and 2.0 with hydrochloric acid, with a subsequent sufficient addition of $KMnO_4$ to oxidize any $Fe^{+2}$ present to $Fe^{+3}$. Sodium hydroxide is then added and, when the pH reaches 8–12, the $Fe^{+3}$ precipitates as $Fe(OH)_3$. Other acids, oxidizing agents or bases may be substituted, and all reactants are employed in effective amounts readily calculable by one skilled in the art.

If it is known at this point, due to preliminary analysis of the feedstocks, that compounds other than sodium and/or potassium salts and zinc chloride remain in the solution, these compounds should be precipitated and removed at this point of the process by means known in the art. For most mixed feedstocks generated in the can- and container-manufacturing industries, however, this step will not be necessary.

The aqueous fraction remaining, containing sodium and potassium chlorides and zinc chloride, is then concentrated by evaporation of the excess solvent (steam generation) to achieve a concentration of at least 50 to 60% zinc chloride. The concentration of zinc chloride may then proceed beyond 60% if desired. The finished zinc chloride solution may retain the sodium and potassium salts remaining. The steam generated by the evaporation of aqueous solvent is condensed and returned to the solvent tank as chemically pure solvent.

A distinct advantage of the present method inheres in its generation of only a single liquid stream, with extraction of free metal and solids only. Such an arrangement prevents the creation of any pollutant side streams, and is consistent with the conservation of resources and elimination of hazardous wastes for which the present process was developed.

In theory, which theory is nonetheless nonbinding, the present invention owes its unique advantages at least in part to the initial heating of the mixed feedstock. By charging the mixed feedstock to a heating vessel or furnace prior to any other process step (thus bypassing the traditional initial ball-milling or crushing of drosses, for example) a single heat application accomplishes a number of desirable results. For example, the 600°–750° F. heat melts any free metal present (solder alloy, etc.) so that it can be drawn off. The same heat application simultaneously melts substantially all of the flux salts, the resultant molten or predominantly molten state being useful for a number of reasons including capacity for flow. By melting the free metal and the flux salts together, not only does the presence of the flux salts facilitate melting of free metal, but the two feedstock constituents thereafter separate themselves into upper and lower layers without further energy input. The heat application additionally functions, when necessary, to extract solidified feedstock from a storage drum or container without additional energy. Finally, this same heat application enables all of the water soluble flux salts to go into solution, inasmuch as the hot salts are charged directly to the aqueous solvent in the solvent tank. Applicant, therefore, regards the initial step of heating the mixed feedstock as essential to his invention. Equally essential, of course, is the subsequent step of immediately directing the separated, predominantly molten salt into the solvent. Applicant, therefore, regards these two steps as the foundation of the present novel process.

The present invention is illustrated further by means of the following Example.

EXAMPLE

Five 30 gallon steel drums of solid solder dross/flux salt feedstock suspected to contain tin-lead-aluminum solder, sodium and potassium chloride, particulate aluminum, tin-lead oxides and salts of lead, zinc, copper and iron were charged in entirety to a 650° F. Funnel-based tank furnace having valved outlets on the bottom and side. Flumes were fitted to the valved outlets; the flume from the funnel outlet led to an empty storage drum and the flume from the side outlet led to a solvent tank. The solvent tank contained 250 gallons of chemically pure water at about 70° F.

After 20 to 25 minutes, two phases had been formed within the furnace; the predominantly molten flux salts formed the upper phase and the molten free metal formed the lower phase. The upper molten salt phase was drawn off via the side outlet and directed by flume to the solvent tank. The total volume of the molten salt phase was 50 gallons. The agitation caused by the infusion of the molten salts into the aqueous solvent, along with the concomitant heating of the solvent and the heat of the resultant reaction, caused all but the tin-lead oxides to go into solution. The tin-lead oxides were then separated from the solvent by filtration.

The molten free metal phase from the furnace was drawn off via the funnel outlet. The molten solder alloy recovered as "free metal" from the feedstock was directed by flume to a mold and was allowed to solidify. The five empty 30 gallon steel drums were then removed from the tank furnace.

The hot aqueous solvent containing the dissolved salts was cooled to but not below 70° F. Lead chloride precipitate formed, settled in the solvent tank, and was collected and removed from the aqueous solution. The resultant solution was then retained for later sequential removal of its copper, iron, sodium and potassium salts.

Although the invention has been described with reference to more particular materials and particular processes, the invention is to be limited only insofar as is set forth in the accompanying claims.

I claim:

1. A process for recovering metals and metallic salts from mixed feedstocks of solder drosses and contaminated flux salts comprising the steps of:
   (a) heating a quantity of the mixed feedstock to melt its free metal and metallic salt constituents, whereby the molten constituents separate into an upper salt layer of at least partially molten salts and a lower metal layer of molten free metal;
   (b) drawing off said lower metal layer;
   (c) drawing off and directing said at least partially molten salt layer into a volume of water at ambient temperature, said volume being effective to dissolve the water soluble salts in said salt layer; and
   (d) differentially precipitating from the resulting solution each salt other than zinc chloride and any sodium or potassium salts present in the solution.

2. The process according to claim 1 wherein step (a) further comprises the step of:
   (a) heating a quantity of the mixed feedstock to between about 600°–750° F. to melt its free metal and metallic salt constituents, whereby the molten constituents separate into an upper layer of at least partially molten salts and a lower layer of molten free metal.

3. The process according to claim 1 wherein step (c) further comprises the step of:
   (c) drawing off said salt layer by weight into 1 to 5 parts by weight of aqueous solvent to dissolve the water soluble salts in said salt layer.

4. The process according to claim 1 wherein step (c) further comprises the step of:
   (c) drawing off said salt layer by weight into 1 to 5 parts by weight of aqueous solvent maintained at about 70° F. to dissolve the soluble salts in said salt layer and to raise the temperature of the aqueous solvent to at least about 120°–130° F.

5. The process according to claim 1 wherein step (d) further comprises the step of:
   (d) differentially precipitating, from the resultant solution, lead salts, copper salts, and ferric hydroxide, in sequence, whereby zinc chloride and any sodium or potassium salts present remain in solution.

6. The process according to claim 5 wherein the differential precipitation of lead salts is effected by controlled cooling of the aqueous solvent to about 70° F.

7. The process according to claim 5 wherein copper and other heavy metals are precipitated by an ion transfer effected by contacting said solution with zinc metal anodes.

8. The process according to claim 5 wherein ferric hydroxide is removed from the aqueous solution by acidification, oxidation and precipitation.

9. The process according to claim 5 wherein said aqueous solution is evaporatively concentrated to at least about 50 to 60% by weight zinc chloride.

10. The process according to claim 1 wherein step (a) further comprises the step of:
    (a) charging to a heating chamber maintained at about 600°–750° F. both the mixed feedstock containing metals and metallic salts and the container for said feedstock, whereby said metal and said metallic salt constituents of the feedstock separate into an upper salt layer of at least partially molten salts and a lower metal layer of molten free metal, and further whereby the container for said mixed feedstock is not significantly affected by the heating process and may be retrieved for reuse.

11. The process according to claim 1 wherein step (a) further comprises the step of:
    (a) heating a quantity of the mixed feedstock to between about 650°–700° F. to melt its free metal and metallic salt constituents, whereby the molten constituents separate into an upper salt layer of at least partially molten salts and a lower metal layer of molten free metal.

12. The process according to claim 8 wherein the acidification, oxidation and precipitation of ferric hydroxide from aqueous solution is accomplished by means of sequential additions of hydrochloric acid, potassium permanganate, and sodium hydroxide.

* * * * *